United States Patent Office

Re. 24,174
Reissued July 3, 1956

24,174

CORK-BOUND HOT-PRESSED BOARDS

Clark C. Heritage, Tacoma, Wash., assignor to Weyerhaeuser Timber Company, Tacoma, Wash., a corporation of Washington No Drawing. Original No. 2,736,063, dated February 28, 1956, Serial No. 232,863, June 21, 1951. Application for reissue April 19, 1956, Serial No. 582,513

19 Claims. (Cl. 18—47.5)

This invention relates to hot pressed structures, usually boards, made from wood particles bonded together with the thermoplastic constituents, and particularly the cork tissue component, of the barks of coniferous trees.

It is an object of the present invention to provide hot pressed structures employing wood particles and comminuted bark as the principal constituents, the thermoplastic components of the bark functioning as a binder material. A further object is to provide a method for making hot pressed structures from a mixture of wood particles of varying size and shape, and from comminuted bark containing an appreciable amount of cork. Incidental objects are to provide both the operable and optimum percentage compositions of the materials for different purpose boards; both operable range and optimum pressing conditions of pressure, temperature, and time; both the operable and optimum ranges for moisture content for the wood particles, cork particles, and the felted mat preliminarily to hot pressing; and to provide means, either as additive materials or by novel treating methods, for producing a board having a water absorption capacity of a quality acceptable for industrial and commercial uses. Other objects and advantages of the invention will appear from the following detailed description.

The invention contemplates broadly the discovery that the cork and parenchyma tissue components of the bark of coniferous trees may be utilized as thermoplastic binding materials for binding together fibers or other wood particles conventionally used in the making of hot pressed structures, such as boards, molded articles, and the like. Such hot pressed structures are referred to herein generically as boards. The principal application of the invention is in the making of the various types of artificial boards made from wood particles or wood fibers and commonly denominated structural hardboards, core boards, panel boards, moldable boards, molded boards, insulation boards, etc.

The bark from which thermoplastic binding materials are derived may be obtained from many species of trees. Particularly suitable are the barks of coniferous trees used commercially as sources of lumber and wood products, since the barks of such trees are obtainable in large quantities at low cost.

The bark of coniferous trees is composed primarily of three different tissue components, to-wit: cork, sclerenchyma tissue in the form of either bast fibers or stone cells, and parenchyma tissue made up chiefly of sieve tubes but containing also food storage cells, companion cells, and connecting ray tissues. Each of these three tissue components differs widely from each other, both in appearance and in their physical properties. The cork and parenchyma tissue fractions are thermoplastic, whereas the sclerenchyma tissue fraction is not. However, the cork component provides better flow characteristics than the parenchyma tissue component; produces boards of lower density than the parenchyma tissue and thereby enables the attainment of higher strength-density ratios than can be obtained with parenchyma tissue; and, accordingly, is the bark tissue component preferred as the binder material in the present invention.

The bark may be fractionated into its separate components by methods which rely upon the selective comminution of the bark constituents followed by the application of mechanical methods for separating the products of various particle size. Such methods are represented by those disclosed in the patent to Anway for Method of Treating Bark, No. 2,437,672, issued March 16, 1948, in the patent to Pauley for Production of Pure Bark Fiber, No. 2,446,551, issued August 10, 1948, and in the copending application of Bror L. Grondal and Calvin L. Dickinson, for Method of Treating Bark, Serial No. 572, filed January 5, 1948, now Patent No. 2,627,375, issued February 3, 1953, said application having a common assignee with this application. The whole bark is subjected to one or more comminuting operations at a controlled moisture content, whereby the non-fibrous phloem is reduced to a powder, the fiber bundles are opened up to release the individual fibers, but the relatively resistant aggregates of cork cells comprising the cork layers are not substantially reduced in size. There are thus produced three fractions having different particle sizes, i. e., powdered phloem or parenchyma tissue, ultimate fibers or stone cells (sclerenchyma tissue), and natural cork.

The cork component of bark flows with ease when subjected to heat and pressure. It imparts a high degree of flow to compositions in which it is contained, and contributes strength properties corresponding to those contributed by thermosetting resins. Cork in the form of flakes or granules compressed in a mold at 3000 pounds per square inch and 300° F. for a time period of seven minutes flows readily throughout the mold to form a board having a smooth, glossy surface. The color of the board is uniform and individual particles of the cork are not distinguishable. The foregoing properties are only partially obtained from the parenchyma tissue and are substantially lacking in the sclerenchyma tissue. For example, the fiber of bark flows with difficulty when subjected to heat and pressure. The surfaces of articles made, for example, by compressing the fibers of Douglas fir bark in a mold at 300° F. under pressure of 3000 pounds per square inch for about 7 minutes, are uneven and rough. The individual fibers do not readily blend together to form a molded article having a smooth, glossy and uniform surface, and the fibers are distinguishable at the surface and may be rubbed therefrom by frictional contact. A bark fraction consisting substantially of parenchyma tissue in powder form, heated and pressed under the conditions described above, forms a board having a smooth, hard surface of uniform dark color. The surface is dry and has a higher gloss than does the surface of the cork board. Parenchyma tissue, therefore, contributes some of the properties of both cork and fiber, and, in addition, is useful for contributing to the appearance of the finished article.

Whole barks containing an appreciable amount of cork are of practical utility in the practice of the invention, it being necessary, however, that the cork content of the bark constitute not substantially less than 5% of the total mixture of bark and wood particles. The other constituents of the bark contribute their respective properties to the completed board, the sclerenchyma tissue, in the case of the barks of Douglas fir, Western red cedar and redwood, adding to the fiber content of the mixture.

The cork component obtained from coniferous trees is not to be confused with the cork of the Mediterranean cork oak. Mediterranean cork oak bark is not thermoplastic. It is true that Mediterranean cork oak bark is sometimes bound under pressure and heat, but such binding comes about as a result of the cementing action of a resin surrounding the cork cells. The individual cork particles remain discrete, even when bonded together by the inter-cellular resin content of Mediterranean cork. This is quite contrary to the action of the cork from coniferous trees, inasmuch as such cork flows upon the application of heat and pressure of the order of 400 pounds per square inch at 400° F., and congeals upon cooling to an amorphous, homogenous solid.

Cork derived from the bark of coniferous trees differs further from that of the Mediterranean cork oak in that it demonstrates its thermoplastic properties at temperatures which are far below those necessary to soften the resinous content of the cork oak bark.

Still further differences between the cork of coniferous trees and Mediterranean cork with respect to their physical and chemical properties are pointed out in the application of Robert D. Pauley, Serial No. 36,409, filed July 1, 1948, for Bark Components as Resin Ingredients.

The fibrous material employed in the preparation of the boards of the present invention may be derived from usual sources. Among these are, for example, cotton, flax, cornstalks, bagasse, wood fiber, and many others. Particularly suitable are the fibers obtained from the woods of such trees as are utilized in the production of lumber and paper pulp, representative woods being aspen, jack pine, Douglas fir, white fir, and Western red cedar. Wood fibers prepared by either the Asplund defibrator or the McMillan machine are particularly useful in the manufacture of hardboards. Asplund defibrator fiber is prepared by the process and machine disclosed in Asplund Patents Nos. 2,008,892 and 2,145,851; and McMillan fiber is disclosed in McMillan Patent No. 1,913,607. It is to be understood that the employment of wood fibers or wood particles from the species named above in the preparation of the hardboards exemplified hereinafter is merely illustrative and is not intended as limiting the scope of the present invention.

Having thus generally described the nature and source of the principal ingredients of the boards of the present invention, the invention will now be described with reference to the details of composition and processing employed.

STRUCTURAL HARDBOARDS

The primary requirements of hardboards representing the highest quality of artificial lumber for structural purposes are that they have a high ratio of structural strength to density, high water resistance, good workability (i. e., amenability to sawing, nailing, and so forth); and, in many instances, a pleasing appearance is a requisite. Structural hardboards are usually either ⅛ or ¼ inch in thickness.

It has been found that a variation in fiber size is desirable to provide a pleasing, non-repetitive surface pattern. A preferred fiber size is that having a four screen coarseness modulus of about 200, as determined by the method disclosed in U. S. Patent No. 2,325,055, issued July 27, 1943, to C. C. Heritage. However, it is to be understood that hardboards can satisfactorily be made from a wide range of both fiber and wood particle sizes. The size mentioned above is preferred for the reason that optimum physical properties of the boards are obtained when fiber sizes in this vicinity are used.

The cork used as a binder for the hardboard is obtained from the barks of coniferous trees in a manner hereinbefore described. It has been found that the structural strength, water resistance, and workability increases as the particle size decreases. Cork particles of a size which will pass through an 80 mesh screen provide the requisite high degree of structural strength and, at the same time, make the practice of the invention practical from a safety and economic standpoint.

*Proportions.*—The cork and wood particles may be used in a wide range of percentage ratios. However, the range of percentage ratios is fairly narrow with reference to the optimum quality for any specific condition of processing or for a particular purpose board. The following observations may be noted: Other conditions remaining constant, the water absorption decreases progressively at a diminishing rate of decrease as the ratio of cork to wood increases. The greatest rate of improvement in water resistance is made by the addition of increments of cork in the range from 0% to 10%. See Table I, below:

*Table I*

Pressing temperature ..... 300° F.
Pressure ..... To stops set for ⅛" thickness.
Time of pressing ..... 15 min.
Density of board (adjusted) ..... 60 lb./ft.³

| Percent Cork (Abies concolor) | Percent Wood (Abies concolor McMillan fiber) | Percent Moisture Content Mat., o. d. basis | Percent Water Absorption | Cond. Density | Modulus of Rupture #/in.² |
|---|---|---|---|---|---|
| 0 | 100 | 21 | 150 | 52 | 2,250 |
| 5 | 95 | 23 | 80 | 59.5 | 3,600 |
| 10 | 90 | 24 | 66 | 60.8 | 4,200 |
| 15 | 85 | 27 | 61 | 57.5 | 4,600 |
| 20 | 80 | 28 | 53 | 48.3 | 4,800 |
| 25 | 75 | 27.5 | 50 | 56.5 | 5,300 |
| 40 | 60 | 30 | 42 | 55.5 | 4,500 |

Optimum strength characteristics are obtained with decreasing proportions of cork as the temperature of pressing is raised within practical operating temperature limits of from 300° to 430° F. Stated another way, optimum cork usage decreases as the temperature of pressing is increased. The optimum modulus of rupture values attained over a range of from 0% to 40% cork usage where pressing was conducted to stops set for a board of ⅛" thickness, and the pressing temperatures and times were as shown in Table II, below.

*Table II*

| Pressing Temperature | Press Duration, minutes | Percent Cork (Abies concolor) | Percent Wood (Abies concolor McMillan fiber) | Opti-Modulus of Rupture,[1] p. s. i. | Water Absorption,[1] percent |
|---|---|---|---|---|---|
| 300° F. | 15 | 25–30 | 75–70 | 5,100 | 48 |
| 400° F. | 8 | 5–10 | 95–90 | 6,300 | 21 |

[1] Values shown corrected to board densities of 60 lbs./ft.³.

It will also be noted that lower water absorption values were obtained at 400° F. than at 300° F., which shows that temperature of pressing is an important factor in determining water resistance, since, as noted in Table I, above, other conditions remaining constant, increased cork usage promotes increased water resistance.

Cork usage has been correlated with pressure. It has been found that pressures of approximately 400 pounds per square inch are required to produce boards of 60 lbs./ft.³ density using proportions of 5–10% cork and 95–90% wood fibers, whereas pressures of from 310–340 pounds per square inch are adequate to produce boards of 60 lbs./ft.³ density from cork usages of 25–30% and wood fibers 75–70%. Yet another correlation was established for cork usage with respect to workability of the finished board. Boards containing smaller proportions of cork, such as 5–10%, were found to leave fuzzy or frayed edges when sawed. Boards containing 40% cork chipped at the edges when sawed and were more brittle than those in the range of from 15% to 25% cork content. Nailability of boards improved as the cork content was increased from 0% to 25%. It is concluded, therefore, that an optimum cork content for the production of all-purpose, high quality structural boards of the 60 lbs./ft.³ density class is in the range of 15–25%.

The preferred process for the making of the boards of the present invention is of a type known as dry felting. The wood fiber and cork particles are mixed intimately and distributed uniformly and evenly over the surface of a screen in a felting operation calculated to provide a board when hot pressed of predetermined thickness and density. Means are preferably provided to prepress the unheated mat as formed to a considerably reduced thickness in order to reduce its bulk for convenience in subsequent handling steps. When the mat is formed on a moving screen, the pre-pressing is conveniently accomplished by suitably tensioned rollers disposed transversely of the moving screen and adjacent the felting area.

The mat is removed from the forming screen and placed on either a screen or a smooth caul and pressed under conditions of pressure, temperature, and time, which are discussed hereinafter.

Another factor found to be important from both the composition and processing standpoint is the moisture content of the fiber and cork before mixing and felting, and the moisture content of the mat after felting. All references herein to moisture content are to moisture content on an oven dry basis; i. e., the moisture content reported is a percentage based on the oven dry weight of the substance.

For example, a moisture content of 25% o. d. b. is equal to 20% moisture on a total or wet basis of the substance. It has been found that the moisture content of the cork for best results should be in a range of from 5% to 20%, and that the best strength characteristics for the pressed board are obtained using cork at the lower percentages of moisture content.

The moisture present in the fiber has been found to function as a plasticizer during the hot pressing treatment. It has been found, further, that as the moisture content of the fiber is raised from 20% to, say, 50% the water resistance characteristics of the board increase, but the structural strength properties decrease. Accordingly the moisture content of the fiber prior to felting was fixed at a range of between 20% and 50%. Mixing of the cork and fiber particles, and felting, is facilitated at higher moisture contents of the fibers. The cork particles seem to adhere to the fibers better at the higher moisture content and thereby to provide a greater degree of intimate dispersion. Accordingly, the process was devised of mixing the cork and fiber, with the cork at a moisture content of from 5–20% and with the fiber at a moisture content of from 20–50%, and after the felted mat has been formed the moisture content of the mat is reduced to 20–25% before pressing. In this manner, the advantages of the higher moisture content for the fiber during mixing and the advantages of better strength characteristics provided by the lower moisture content of the mat before pressing were both obtained. A convenient method for adjusting the moisture content of the felted mat is to draw air through the same.

In a study made to determine the effect of moisture content on fiber, cork, and mat, using 25% concolor cork, 75% concolor fiber, and pressing at 400° F., 400 pounds per square inch, for 8 minutes, it was concluded that the optimum moisture content for the fiber was 30–50%, cork 5%, and mat 20–25%. Boards pressed under these optimum conditions and a standard quality of Masonite Presdwood had modulus of rupture and water absorption values, corrected to 60 lb./ft.³ density, as follows:

| | Modulus of Rupture | Water Absorption |
|---|---|---|
| Wood fiber and cork | 6,200 | 16–19 |
| Masonite | 6,000 | 18 |

As high a moisture content as practicable is desirable for the cork because finely divided cork is hazardous from a fire and explosion standpoint. An optimum of 10–20% was selected on the basis that cork with moisture content lower than 10% was dusty and cork with moisture content of 25% had a tendency to agglomerate. Adherence of cork to fiber during mixing improved as the fiber moisture content increased. It was found desirable to use the fiber at 20–50% moisture content for mixing the cork, and to dry the felted mat to 20–30% moisture content before hot pressing.

*Temperature of pressing.*—The cork flows more readily at higher press temperatures, and strength characteristics and water resistance of the board are improved in proportion to increase in temperature up to a safe margin under the temperature of decomposition. Press temperature was found to be correlated with press duration, using a ratio of 25% cork 75% wood fiber and with the pressing being down to stops so as to produce a board of ⅛' thickness, in the following manner:

*Table III*

| Temperature, ° F. | Minimum press time to produce satisfactory board, minutes | Modulus of Rupture, p. s. i. | Water Absorption,[1] percent in 24 hr. |
|---|---|---|---|
| 260 | 25 | 4,700 | 54 |
| 300 | 15 | 5,300 | 50 |
| 330 | 8 | 5,400 | 48 |
| 375 | 8 | 5,900 | 53 |
| 400 | 3–8 | 5,800 | 41 |

[1] Values corrected to 60 lb./ft.³ density.

For each duration of pressing, all values improved as the temperature was increased, except at 25 minutes duration, increase of temperature from 375° to 400° F. showed a decrease in flexural strength, thereby indicating that at higher temperature longer duration may be detrimental, and, likewise, at long durations, higher temperatures may be detrimental.

*Duration of pressing.*—As indicated above, variations in the duration of pressing materially affect qualities of the finished board. Increased press time improved the water resistance but pressing for lengths of time beyond 15 minutes was found to cause the modulus of rupture values to drop below an acceptable value. Accordingly, an optimum time was determined to be about 8 minutes, considering economy of operation as a factor; otherwise, about 15 minutes.

*Pressures.*—Pressures may be varied over a range, for example, of 300 to 3000 pounds per square inch, which is customary in the art. The main consideration involved is that the pressure be sufficient to compress the fiber mat to a board of the desired thickness and density, being ordinarily about ⅛" and 60 lb./ft.³ in the case of structural hardboards. The two attributes do not necessarily occur concurrently, and since the thickness is the more critical from the standpoint of the consumer, the board thickness is preferably controlled exactly by use of predetermined stops and the desired density is obtained as nearly as possible by control of the charge, i. e., weight of the mat per unit area. It has generally been found that pressures in the range of 350 to 400 pounds per square inch are effective, although when stops are used on the press the pressure on the mat is not determinable without special apparatus. However, as hereinbefore pointed out, the pressure required for pressing to a prescribed density is correlated with the percentage of cork present, as, for instance, 400 pounds per square inch were required to produce 60 lb./ft.³ board ⅛" thick when only 7½% cork is used, whereas 310–340 pounds per square inch pressure are sufficient when 25% cork is used. In other words, the pressure for any given amount of fiber material and predetermined board density and thickness is capable of being correlated with the capacity of the binding agent to flow. Accordingly, since increase in moisture content promotes flowability, it would also tend to reduce the pressure required for pressing.

In addition to the function of the cork as a binding agent, it serves a very important and useful function for providing water resistance to the board. Hardboards may be made from fiber without the use of any binder, and with any one or more of many binding materials commonly employed in the prior art. However, the self-bound boards or boards bound with binding materials of the prior art other than the relatively expensive synthetic resins are subject to the disadvantage of having very low water resistance, i. e., high water absorption characteristics. The water absorption of a self-bound board when pressed at 300° F. for 15 minutes will range as high as 150%, based on the weight of the board. The addition of cork to the hardboard in the proportions of 15% cork and 85% fiber under the same pressing conditions produces a hardboard in which the water absorption has been reduced to approximately 61% and use of 40% cork lowered the water absorption to 42%. However, other factors also contribute to improvement of water resistance, such as increasing temperature and duration of pressing and moisture content of the pre-pressed mat as nosed hereinbefore. Likewise, increase in density reduces water absorption, but, since board density is usually an objective requirement, it is not subject to variation for improvement of the water resistance. The best results for water resistance in a structural hardboard, when the critical factors of strength and economy are considered, is obtained when using 15% cork and 85% wood fiber, a mat of 20–25% moisture content, and pressing at 400° F. for 8 minutes. In such a board the water absorption is reduced to approximately 35%. A post-press conditioning of the hot pressed boards for one-half hour at 380° F. is effective to reduce water absorption to an average value of approximately 20%. The baking may be conducted over temperatures ranging from 250° to 400° F., and the resistance to water is improved as the temperature of baking is raised. However, baking at 380° F. and higher has a deleterious effect on strength properties when continued beyond one-half hour. This fact fixes the optimum baking limits at 380° F. and one-half hour duration, although, of course, both limits may be exceeded where greater water resistance is desired at the sacrifice of strength.

The manner of mixing the wood fiber and cork or whole bark has not been specifically pointed out herein, and may, obviously, be conducted by any one of numerous methods at the discretion of the operator. One variation which has been found to be particularly efficient, when Asplund defibrator fiber is used for the wood fiber, is to mix the cork with the chips as they are being fed to the defibrator machine. In this manner, thorough mixing is accomplished at the same time the fiber is being prepared.

CORE BOARD AND SIMILAR BOARDS

When the invention is applied to the manufacture of core boards, i. e., artificial boards which are to be used as the core for laminated structures in which the outer plies are, for example, veneers of wood, paper, plastic sheets or plastic coatings, structural strength for the core becomes of relatively less importance, but a high degree of water resistance is desired because such boards are frequently subjected to considerable moisture, as in the case of table tops. Screw holding ability and bonding strength are also important qualities. Hardness is a quality desired for some uses. Screw holding ability is, as its name implies, measured by the number of pounds of direct pull required to extricate a specified size screw from the board. Bonding strength as reported herein is a test of the resistance of the board to splitting or delamination as measured by impressing a ball of 1 cm. diameter into the edge of a board sample 1" x 1" and observing the maximum load of force required until splitting or separation of the lamina occurs.

Similar problems of formulation and processing, and similar objectives of quality to those involved in the manufacture of core board, are involved in the manufacture of surfacing or decorative boards to be used for mill work such as door panels, or for facings to replace plywood and veneers, or for wainscot, sidewall decorative simulated tiles, and the like. Such boards are sometimes referred to as panel boards. In all such boards, structural strength is ordinarily of less importance than water resistance, screw-holding ability, and bonding strength. Accordingly, these boards may be considered as included in the discussion of the invention as applied to the manufacture of core board, the main difference being in the matter of surface appearance.

Boards made for the various purposes named above are fabricated over a wide range of densities, varying from about 30 lbs./ft.$^3$ to as much as 80 lbs./ft.$^3$. Thicknesses are used from ¼ to ¾ inch. As pointed out in the discussion of structural boards, flexural strength and water resistance are dependent upon board density. Water resistance is also dependent upon thickness of board, improving with increasing thickness probably due to diminishing penetrability. Accordingly, both board density and thickness must always be considered in evaluating water absorption results. However, since core boards and the like are not ordinarily designed for high flexural strength, variations in density may not greatly affect flexural strength. On the other hand, since water resistance is a prime objective in almost every case, the formulations and compounding are such that a high degree of water resistance will be obtained even at 30 lbs./ft.$^3$ density. Increase in density results in increased water resistance in about a linear relationship.

Core boards, surfacing boards, and decorative boards are designed for such a wide variety of uses, as above pointed out, that no general standards of quality can be established, and the standard for specific uses may be limited to one or only a few of the various properties, such as water resistance and screw-holding ability. It may be said, however, that the flexural strength usually vary from about 250 to 3000 lbs./in.$^2$, and the resistance to water as measured by water absorption will be desired generally in a range from 20% down to less than 1%. Typical values of screw-holding ability are from about 50 to 400 pounds resistance to direct pull and for bonding strengths of from about 75 to 400 pounds load.

Wood particles for core boards and the like may be used over a wide range of particle size and shape, including uncomminuted hogged waste from furniture making and other wood working activities, sawdust, comminuted bark, sander flour, wood flour; vegetable fibers such as cotton, flax, cornstalks, and bagasse; mineral fibers such as asbestos and glass; and, of course, wood fibers of the Asplund or McMillan type may also be used.

The shape of the particle is more important than the size, from a structural strength standpoint; the more fibrous the particle, the greater the strength. However, the more fibrous particles such as McMillan and Asplund wood fibers are more expensive than such industrial waste materials as sawdust, sander flour and hogged waste. Since structural strength is usually of secondary consideration in core boards, and since economy is always an important consideration, resort is had in the manufacture of core boards to the cheaper wood particle materials, even though they are less fibrous by nature. It will be appreciated that the larger the particle size, the more pronounced its effect on surface appearance of the board. However, when the boards are to be used as the core of laminated structures, surface appearance is not of particular importance.

*Proportions.*—The cork and wood particles may be used over a wide range of proportions, extending from relatively small amounts of cork, as, for example, 5% to larger amounts including actually 100% of cork. Use of higher proportions of cork contributes to the production of boards of higher density than obtained when using smaller percentages of cork and larger percentages of wood particles. Two samples of ¾" thick board compressed to 70 pounds density, made entirely from a Douglas fir bark fraction originally containing approximately 80% cork and 20% bast fibers and small amounts of wood, from which the wood impurity had been removed and which was ground to an average 80 mesh particle size, had modulus of rupture values of 1400 and 1800 lbs./in.$^2$ and water absorption values of .92 and .74%. For the best combination of strength, water resistance and cost for boards in the range from 30 to 50 pounds density, it is preferred to employ the cork as a binder for wood particles in proportions of from about 50% wood particles and 50% cork to 25% wood particles and 75% cork.

The effect of varying proportions of cork and hogged pine waste is well illustrated in Table IV below. The physical test values reported are corrected to a density of 50 lbs./ft.$^3$. The hogged pine waste is a −14+65 mesh fraction and the cork is substantially pure Douglas fir, +48 mesh size. The boards were pressed at 400° F. for 10 minutes to ¼" thickness by use of stops, and were cooled 10 minutes before removing from the press.

*Table IV*

| | Varying Percentages of Cork | | | | | |
|---|---|---|---|---|---|---|
| Hogged Waste | 90 | 80 | 70 | 50 | 25 | 0 |
| Pure Cork | 10 | 20 | 30 | 50 | 75 | 100 |
| Modulus of Rupture, Lbs./in.$^2$ | 750 | 840 | 870 | 900 | 1,500 | 1,000 |
| Water Absorption, percent | 47 | 43 | 22 | 18 | 11 | 3.8 |
| Hardness, R-scale | −52 | −55 | −55 | −55 | −55 | −50 |

It will generally be observed from the above table that usages of 50% cork lowers the water absorption to 18%, 75% cork lowers water absorption to 11%, and 100% cork lowers water absorption to 3.8% for even a 50 pound density, ¼" thick board. On another test using 50% hogged pine waste as received (without screening out the ±14 and −65 mesh particles) and 50% pure Douglas fir cork, a 50 pound density, ¼" thick board had a modulus of rupture of 1000 pounds per square inch and water absorption of 15%.

Cork purity was found to have a sharply significant effect on board quality. The improvements in strength and water absorption values for boards of 40 lb./ft.$^3$ density and ¾" thickness to be obtained by the grinding of the cork and by the use of substantially pure cork (i. e. cork of about 98% purity) in contrast to a bark fraction containing approximately 80% cork and 20% bast fibers, wood and other impurities, are shown in the table below:

*Table V*

| Material | Modulus of Rupture, p. s. i. | Water Absorption, percent |
|---|---|---|
| Douglas fir cork, 80% purity, +48 mesh size | 120 | 8.8 |
| Douglas fir cork, 80% purity, average 80 mesh size | 150 | 6.3 |
| Pure Douglas fir cork, +48 mesh | 940 | 2.6 |

The results of Table V, above, were confirmed when tests were made on boards of 50 lbs./ft.$^3$ density and ¼" thickness compounded from equal proportions of uncomminuted hog waste and a cork material, as shown in Table VI, below.

*Table VI*

| Material | Parts, percent | Modulus of Rupture, p. s. i. | Water Absorption, percent |
|---|---|---|---|
| Hogged waste | 100 | 250 | 250 |
| Hogged waste | 50 | 280 | 50 |
| Douglas fir cork, 80% purity, wood impurity removed, +14 mesh size | 50 | | |
| Hogged waste | 50 | 800 | 19 |
| Pure Douglas fir cork, +48 mesh | 50 | | |

It will be noted in Table VI, above, that the addition of cork, whether pure or impure, to hogged waste, improves the flexural strength and water resistance properties, the improvement in water resistance varying from 250% water absorption in the case of 100% hogged waste to 19% when the board is made of 50 hogged waste and 50% pure Douglas fir cork. The difference between the use of substantially pure cork and cork of 80% purity in the 50–50 mix with hogged waste raises the modulus of rupture values from 280 to 800 pounds per square inch.

The processing of the materials to form core boards is about the same as in the case of structural hardboards, with this difference: There is little or no felting. The materials are mechanically mixed together, and then the "mass" of particles, in contrast to the felted "mat" when wood fibers are being used to make structural hardboards, is placed in a suitable mold, and pressures of the order of from 100 to 1500 pounds per square inch are applied. Temperatures are maintained in the range of 250° to 400° F., with the higher temperatures being preferred. Pressing durations may vary from 5 minutes to 1 hour, or even longer, but usually 10 minutes are sufficient for the hot pressing. Unlike the structural hardboards, the press or mold must usually be cooled for from 10 minutes to longer periods before removing the pressed board, in view of the relatively large percentages of cork employed, and the thermoplasticity of the cork. Processing conditions were stated for the boards tested and reported in Table IV herein. The boards tested and reported in Table V were pressed to stops for ¾ inch thickness and at 400° F. for 10 minutes and cooled before removal from the press. The boards tested and reported in Table VI were pressed to stops for ¼" thickness and at 400° F. for 10 minutes, and cooled 10 minutes before removing from the press.

As in the case of structural hardboards, resins may be added in minor proportions to improve strength properties of the boards. Both thermoplastic and thermosetting and both natural and synthetic resins may be used. Use of resins, even in small percentages, contributes to increasing the density of the board under the otherwise same conditions of pressing.

It is to be understood that various modifications and equivalents may be used in the practice of the invention, and that the invention lends itself to the various processing techniques of the art and to various applications of utility known in the art.

What is claimed is:

1. A hard rigid board of the character of lumber comprising a closely compacted heat-bonded mixture originally of wood particles and particles of isolated cork originating in the bark of coniferous trees, said cork being present in an amount equal to at least 5% of the mixture and said wood particles being present in amount in the range from 25% to 95% of the mixture.

2. A hard rigid board of the character of lumber comprising a closely compacted heat-bonded mixture originally of wood particles, particles of the bark of coniferous trees, and particles of isolated cork originating in such bark, said cork being present in an amount equal to at least 5% of the mixture and said wood particles being present in amount in the range from 25% to 95% of the mixture.

3. A hard rigid board of the character of lumber comprising a closely compacted heat-bonded mixture originally of wood particles and particles originating in the bark of coniferous trees, the mixture comprising by dry weight from 25% to 95% of said wood particles, and the remainder being said particles from the bark and including particles of isolated cork in amount of at least 5% of the mixture.

4. The product of claim 3 in which the wood particles are comprised of wood fiber containing substantially all the substance of the raw wood from which the fiber is derived and the particles of bark having a size distribution to pass through an 80 mesh screen.

5. The product of claim 4 wherein the wood fiber is present in amount by weight in the range from 60 to 95 parts and the particles from the bark are correspondingly present in amount in the range from 40 to 5 parts.

6. A method of making a hot pressed hard rigid board of the character of lumber comprising the steps of admixing wood particles and a separated cork fraction of the bark of coniferous trees, the latter being in an amount of at least 5% of the mixture, and pressing the mixture under conditions of heat, pressure and time sufficient to increase the density of the mixed mass into a hard compact board and to cause the cork component to flow into intimate bonding admixture with the wood particles.

7. A method of making a hot pressed hard rigid board of the character of lumber comprising the steps of admixing wood particles, comminuted bark of coniferous trees and a separated cork fraction of said bark, the latter being in an amount of at least 5% of the mixture and pressing the mixture under conditions of heat, pressure and time being sufficient to increase the density of the mixed mass into a hard compact board, and to cause the cork component to flow into intimate bonding admixture with the wood particles and bark.

8. The method of claim 7 in which the pressing is continued at approximately 400 pounds per square inch and at a temperature of from 250° to 400° F. for a period of time of from 5 to 15 minutes.

9. The method of claim 7 together with the step of baking the compressed board after removal from the hot press in an oven at a temperature of about 380° F. for a period of about ½ hour.

10. A method of making hot pressed hard rigid board of the character of lumber from a mixture of wood fibers, comminuted material originating in the bark of coniferous trees, said material including particles of isolated cork in amount of at least 5% by weight of the mixture; said method comprising mixing and felting the wood fiber and comminuted bark and cork component, adjusting the moisture content of the felted mat to from 20 to 25%, pressing the felted mat under conditions of heat, pressure and time sufficient to increase the density thereof to a hard compact mass and to cause bark material to flow into intimate bonding admixture with the wood particles and removing the pressed board from the press.

11. A method of making a hot pressed hard rigid board of the character of lumber from a mixture of wood fibers, comminuted bark of coniferous trees and at least 5% by weight of the mixture of particles of isolated cork originating in such bark, said method comprising adjusting the moisture content of the wood fibers to from 20 to 50% oven dry basis and the moisture of the bark and cork component to from 5 to 20% oven dry basis before admixing the materials; mixing and felting the wood fiber, bark and cork component, adjusting the moisture content of the fiber mat to from 20 to 30%, pressing the felted mat under conditions of pressure, temperature and time sufficient to increase the density of the mat into a hard compact board and to cause bark material to flow into intimate bonding admixture with the wood fiber.

12. A method of making a hot pressed hard rigid board of the character of lumber comprising admixing with a major proportion of wood particles a minor proportion of comminuted bark of coniferous trees and articles of isolated cork originating in such bark in an amount of at least 5% of the mixture, felting the mixture to form a mat, pressing the mat under conditions of heat, pressure, and time sufficient to increase the density of the mat into a hard compact board and to cause bark material to flow into intimate bonding admixture with the wood particles.

13. A method of making a hot pressed hard rigid board of the character of lumber from a mixture of wood fibers, comminuted whole bark of coniferous trees and a separated cork component originating in such bark wherein the wood fiber is used in the ratio of about 85 parts of wood fiber to 15 parts of bark material of which at least 5 parts is said cork component, adjusting the moisture content of the wood fiber to 20 to 50% and the moisture of the bark and cork component to 5 to 20% before admixing the materials, mixing and felting the wood fiber, bark and cork component particles, adjusting the moisture content of the felted mat to 20 to 30%; pressing the felted mat at a pressure of the order of 400 pounds per square inch and at a temperature of approximately 400° F. for a period of from 5 to 15 minutes and removing the pressed board from the press.

14. A method of making a hot pressed hard rigid board of the character of lumber from a mixture of wood fibers, comminuted whole bark of coniferous trees and particles of isolated cork originating in such bark, wherein the wood fiber is used in a ratio of about 85 to 15 parts of the bark material comprising at least 5 parts of said isolated cork, which comprises felting the wood fiber and bark material to form a mat, adjusting the moisture content of the felted mat to 20 to 30%, pressing the felted mat at a pressure of the order of 400 pounds per square inch and at a temperature of approximately 400° F. for a time period of from 5 to 15 minutes and removing the pressed board from the press.

15. A method of making a hot pressed hard rigid board of the character of lumber comprising the steps of admixing wood particles, comminuted bark of coniferous trees and particles of isolated cork originating in such bark, said cork particles being present in amount which is at least 5% by weight of the mixture, and pressing the mixed particles under conditions of heat, pressure and time sufficient to increase the density of the mixed mass into a hard compact board and to cause the bark material to flow into intimate bonding admixture with the wood particles.

16. The invention of claim 15 in which the pressing is continued in a range of from 100 to 1500 pounds per square inch at a temperature of from 250° to 430° F. and for a period of time of from 5 to 60 minutes.

17. A method of making a hot pressed rigid board of the character of lumber comprising the steps of admixing approximately 25 to 50 parts of wood particles and approximately 50 to 75 parts of comminuted bark of coniferous trees, including not less than 5% of a separated cork component of such bark, and pressing the mixed particles under conditions of heat, pressure and time sufficient to increase the density of the mixed mass into a hard compact board, and to cause the cork component to flow into intimate bonding admixture with the wood particles.

18. A method of making a hot pressed hard rigid board of the character of lumber comprising the steps of admixing approximately 25 to 50 parts of wood particles and approximately 50 to 75 parts of comminuted material originating in the bark of coniferous trees of which material at least 5 parts consists of particles of isolated cork, pressing the mixed particles under a range of pressure of from 100 to 1500 pounds per square inch at a temperature of from 250° to 430° F. for a period of time of from 5 to 60 minutes, and cooling the mold for a period of time until the compressed board has become hard enough to facilitate removal from the mold.

19. An artificial hard rigid board of the character of lumber comprising a heat-bonded mixture originally of wood particles in an amount upwardly from 25% of said mixture, comminuted bark of coniferous trees and a separated cork component originating in such bark in an amount of not less than 5% by weight of the mixture, said board having a density of not less than 30 or more than 80 pounds per cubic foot, a modulus rupture of not less than 4000 pounds per square inch, and having a water absorbing capacity of not more than 25%.

References Cited in the file of this patent

UNITED STATES PATENTS 2,319,182 Vander Pyl ---------- May 11, 1943

2,348,081 Linzell ---------- May 2, 1944
2,380,214 Burell ---------- July 10, 1945
2,402,554 Irvine et al. ---------- June 25, 1946
2,437,672 Anway ---------- Mar. 16, 1948
2,446,304 Roman ---------- Aug. 3, 1948
2,446,551 Pauley ---------- Aug. 10, 1948